UNITED STATES PATENT OFFICE.

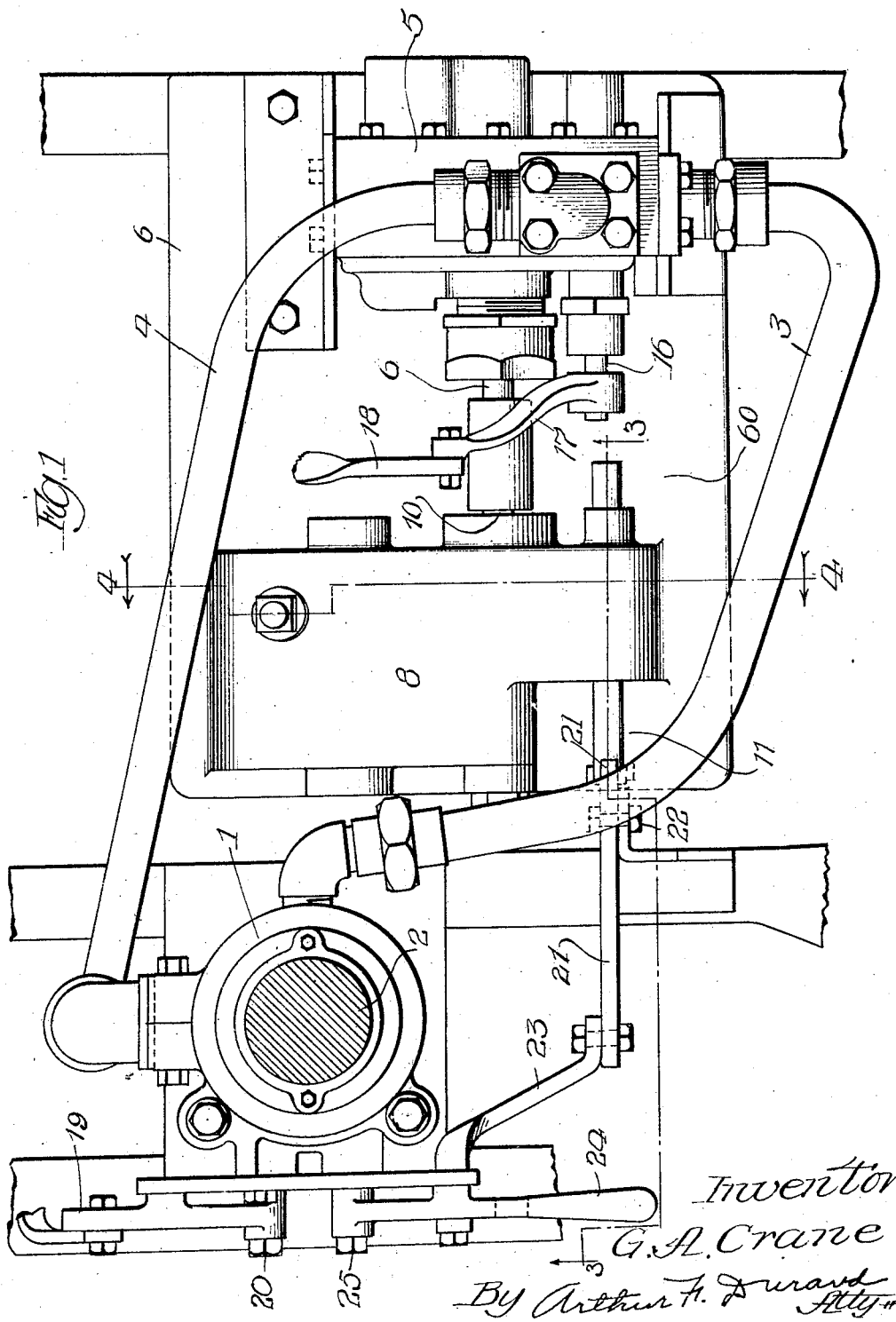

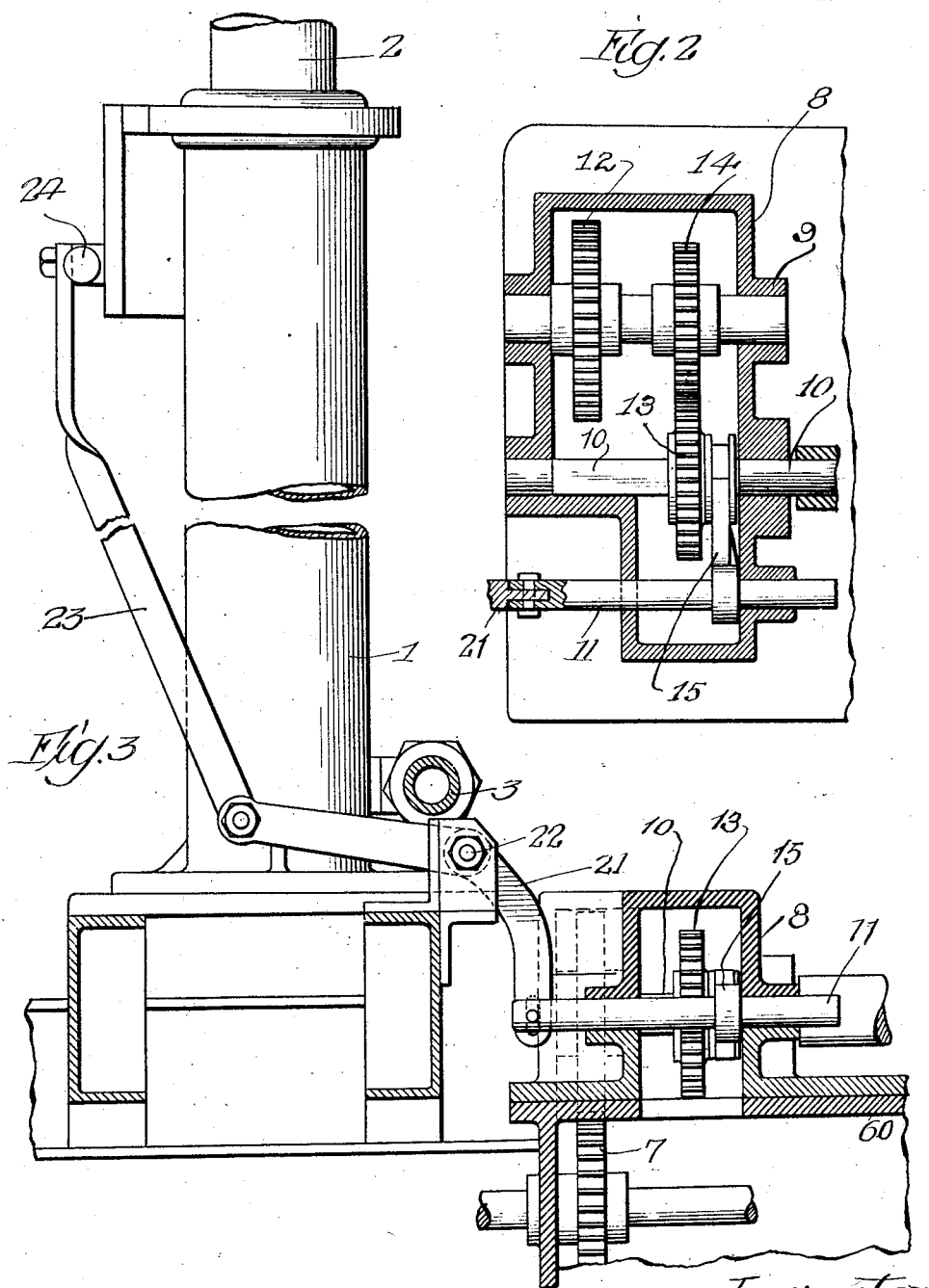

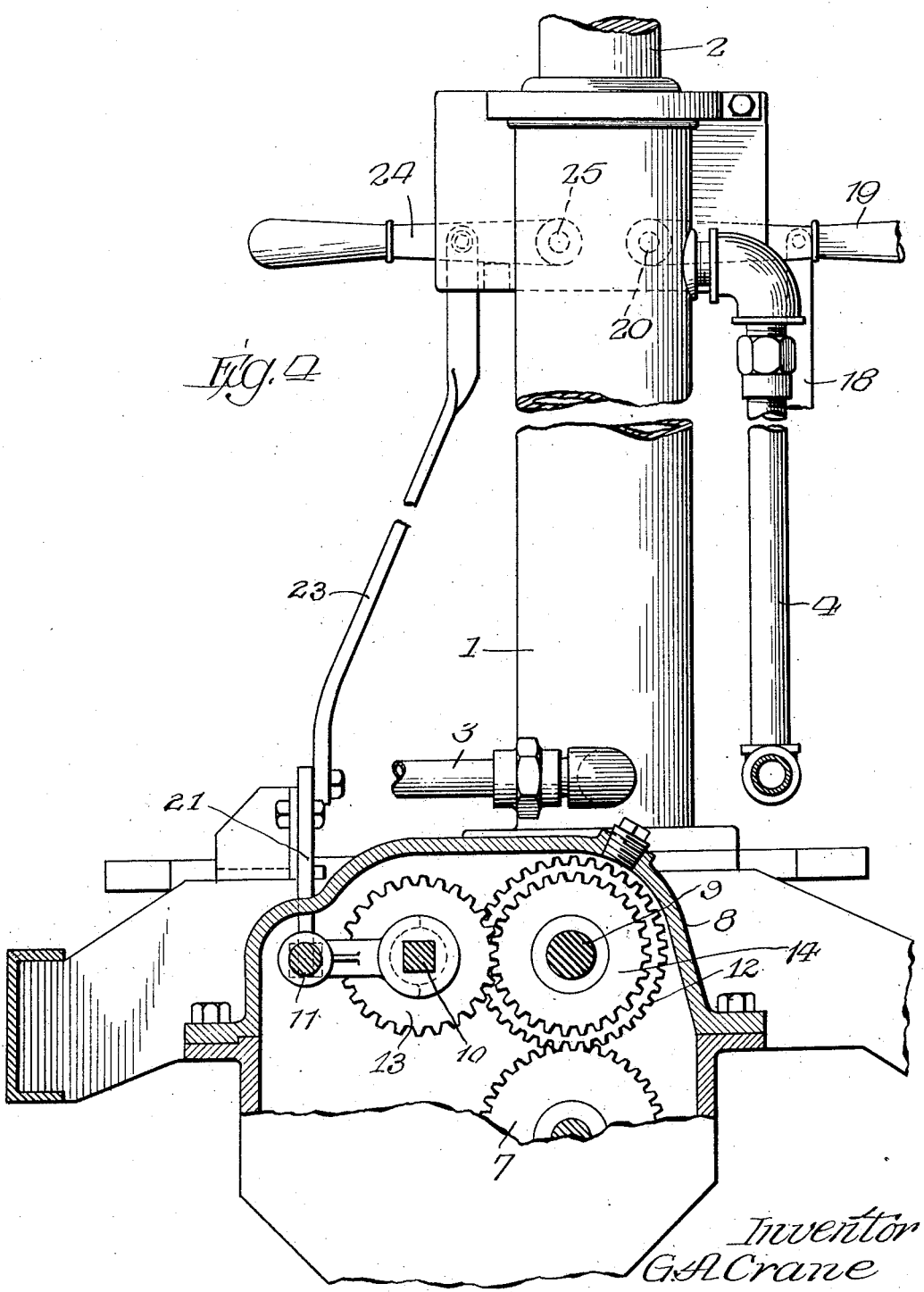

GEORGE A. CRANE, OF CHICAGO, ILLINOIS.

POWER-TRANSMITTING APPARATUS.

1,406,444.   Specification of Letters Patent.   Patented Feb. 14, 1922.

Application filed November 24, 1919, Serial No. 340,230. Renewed December 16, 1921. Serial No. 522,955.

*To all whom it may concern:*

Be it known that I, GEORGE A. CRANE, a citizen of the United States of America, and a resident of Chicago, Illinois, have invented a certain new and useful Improvement in Power-Transmitting Apparatus, of which the following is a specification.

This invention relates to means for operating a pump or other device on a motor truck, by power derived from the engine or motor of the vehicle. In a situation of this kind, the problem is to provide means for conveniently and satisfactorily obtaining power from the transmission gearing of the vehicle to drive the pump which operates the hydraulic jack or hoist. In said prior application an arrangement is shown and described for this purpose.

The object of the improvements constituting the present invention is to provide a novel and satisfactory arrangement for connecting the pump with the transmission gearing of a truck or other motor driven vehicle.

It is also an object to provide certain details and features of construction and combinations tending to increase the general efficiency and the desirability of a hydraulic jack or hoist having a pump therefor operated in this particular manner.

To these and other useful ends the invention consists in matters hereinafter set forth and claimed and shown in the accompanying drawings, in which—

Fig. 1 is a plan of a power transmitting apparatus embodying the principles of the invention.

Fig. 2 is a sectional plan view of a portion of the gearing.

Fig. 3 is a side elevation of the structure shown in Fig. 1, with certain portions thereof omitted, and with other portions in vertical section, the section being taken on line 3—3 in Fig. 1.

Fig. 4 is a transverse vertical section on line 4—4 in Fig. 1.

As thus illustrated, the cylinder 1 of the hydraulic jack or hoist is suitably mounted on the frame or chassis of the motor truck at its lower end, and disposed in upright position, usually immediately in rear of the driver's seat of the vehicle. The ram or plunger 2 slides up and down in said cylinder in the usual manner, and is employed, it will be understood, for tilting the box or body (not shown) of the truck, or for any other purpose. The operating liquid enters the bottom of the cylinder through the pipe 3, when the plunger is pushed upward, and leaves the cylinder through the pipe 4 which leads from the upper portion of the cylinder.

The pump 5 is of any suitable, known or approved character, being preferably a rotary pump, and is driven by the shaft 6 when the latter is rotated. It will be seen that said pump is disposed a distance in rear of the cylinder 1, and that the pipe 3 leads to one port of the pump, while the pipe 4 leads to the other port thereof, whereby operation of the rotary pump in one direction will cause the liquid to enter the bottom of the cylinder and will cause the liquid to be drawn from the top of the cylinder, thus pushing the ram or piston 2 upward. When the motion of the pump is reversed, the liquid then is forced from the pump through the pipe 4 to the top of the cylinder, and is drawn from the lower end of the cylinder through the pipe 3 into the pump, thus causing the ram or plunger 2 of the hydraulic jack to move downward.

The transmission gear of the vehicle is enclosed in the box 60 in the usual manner, and has a gear 7 included in the mechanism thereof. In addition, however, to the usual or ordinary or any suitable transmission gearing having provisions for not only changing the speed, but also for reversing the direction of travel, there is a housing 8 mounted on top of the gear box, and parallel shafts 9 and 10 are mounted in said housing, the latter being suitably coupled to the shaft 6; and, in addition, a rod 11 is arranged parallel with the shafts 9 and 10, and mounted to slide endwise in guides or bearings formed in said housing. A gear 12 on the shaft 9 engages the gear 7, and the shaft 10 has a sliding gear 13 for engaging the gear 14 on the shaft 9, so that rotation of the latter by power derived from the regular transmission gearing will drive the shaft 10 and the shaft 6 and operate the pump. A shifter 15 connects the rod 11 with the sliding gear 13, so that the latter can be shifted into and out of engagement with the gear 14, thus opening and closing the power transmitting connection provided between the regular gearing of the vehicle and the pump. By using the reversing arrangement of the regular transmission gearing the pump can be driven in either direction, so as to operate the ram or plunger of the hydraulic jack to either raise or lower the box or body of the motor truck dumping vehicle, in a manner that will be readily understood.

The pump has a valve operated by a rotary rod 16, and this rod has an arm 17 which is connected by a link 18 with the handle 19 in any suitable manner, so that operation of said handle, which is pivoted at 20 on the front of the hydraulic jack, will open or close the valve of the pump and thereby control the operation of the latter.

The rod 11 is connected at one end to a bell crank 21 which is pivoted on the body frame at 22, and which is in turn connected by a link 23 with the handle 24 which is pivoted at 25 on the front of the hydraulic jack. Therefore, by operating this handle 24 the rod 10 can be reciprocated to shift the gear 13 into or out of engagement with the gear 14, thereby to start or stop the operation of the pump.

In the general assembly of the different instrumentalities, it will be seen that the housing 8 which contains the gearing for operating the pump is located immediately in rear of the hydraulic jack, and that the pump is located immediately in rear of said housing, both the latter and the pump being mounted on top of the gear box 60 which contains the transmission gearing of the automobile. In this way, an advantageous and convenient arrangement is provided for supplying power directly from the regular or usual transmission gearing of a motor truck to the pump which operates the hydraulic jack of a dumping vehicle of this particular character, or for any other purpose.

What I claim as my invention is:—

1. In a motor vehicle, in combination with the transmission gearing thereof, a hydraulic jack disposed in front of said gearing, a pump mounted over the gearing, mechanism to connect the pump with said gearing so that the pump is operated through a lateral power-take-off from the gearing, and connections from said pump to said hydraulic jack.

2. A structure as specified in claim 1, said gearing having a housing, and said pump and said mechanism being mounted on top of said housing, with said mechanism disposed between the hydraulic jack and the pump.

3. A structure as specified in claim 1, said gearing having a housing and said pump being mounted on top of said housing.

4. In a motor vehicle, in combination with the transmission gearing thereof, having a housing for said gearing, the combination of a pump mounted on top of said housing, mechanism on top of said housing to connect said pump with said gearing, so that the pump is operated through a lateral power-take-off from the gearing, and means to control said mechanism.

5. A structure as specified in claim 4, in combination with a power device disposed in front of said mechanism and having hydraulic connection with the exposed and accessible top portion of said pump, said mechanism having a shaft which extends rearwardly over said housing to the pump, so that said shaft transmits power from the motor to said device.

6. A structure as specified in claim 4, having manual provisions for controlling said mechanism and opening and closing the lateral power transmitting connection thus provided between said pump and the gearing, and a power device disposed in front of said mechanism and operated by said pump, together with means to support said mechanism above and in engagement with said gearing, so that said mechanism is disposed between the pump and said power device.

7. The combination of a motor-vehicle transmission gearing, a casing for said gearing, a pump mounted on said casing, a lateral power-take-off gearing, means to support said lateral power-take-off gearing, a power device connected to and operated by said pump, an operating connection from the lateral power-take-off gearing to said pump, means to provide a controllable connection from said transmission gearing to said power-take-off gearing, and means to control said pump.

8. A structure as specified in claim 7, said lateral power-take-off gearing being also mounted on said casing, between the pump and the power device, so that said casing supports both the pump and everything necessary for the operation thereof by power transmitted from the motor to said gearing.

GEORGE A. CRANE.